UNITED STATES PATENT OFFICE.

ARTHUR LÜTTRINGHAUS, OF MANNHEIM, AND OTTO LOHSE AND AUGUST SAPPER, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

BROWN VAT DYE.

1,090,636. Specification of Letters Patent. Patented Mar. 17, 1914.

No Drawing. Application filed February 8, 1913. Serial No. 747,077.

*To all whom it may concern:*

Be it known that we, ARTHUR LÜTTRINGHAUS, Ph. D., OTTO LOHSE, Ph. D., and AUGUST SAPPER, Ph. D., chemists, citizens of the German Empire, residing the first at Mannheim and the others at Ludwigshafen-on-the-Rhine, Germany, have invented new and useful Improvements in Brown Vat Dyes, of which the following is a specification.

We have discovered a new vat coloring matter which we judge, from our investigations, to be an acridin-acridone compound derived from diphenyl, in which there is an anthraquinone-acridone group on the one side and an anthraquinone-acridin group on the other side of the diphenyl linking. It probably possesses a constitution corresponding to the formula

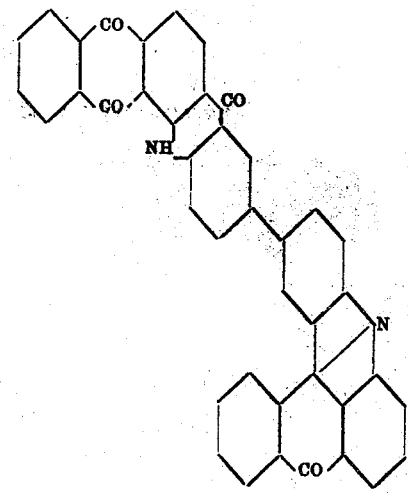

This compound can be obtained by condensing para-amino-para'-chlor-diphenyl with one molecular proportion of 1-chlor-anthraquinone-2-carboxylic acid and heating the product with acetic anhydrid and a little sulfuric acid whereupon ring formation takes place, an acridone ring being apparently formed. This intermediate product is condensed with 1-amino-anthraquinone and then heated with strong sulfuric acid, whereupon an acridin ring is apparently formed, so that the desired acridin-acridone is obtained.

The aforesaid new coloring matter can also be manufactured in another way. We have found that the product obtained when following example 18 of the specification of British Patent No. 894/11 is a mixture consisting principally of the carboxyl derivative of the new coloring matter together with a diacridone. Upon heating the mixture with dilute sulfuric acid containing about 60% of $H_2SO_4$, or treating it in other suitable manner, the carboxylic group can be split off from the acid and the new coloring matter, that is to say, the acridin-acridone produced mixed with the diacridone.

The new acridin-acridone dyes cotton, from an alkaline hydrosulfite vat, producing reddish brown shades. The mixture of acridin-acridone and diacridone, obtainable as aforesaid, can also be employed for dyeing cotton from the vat and produces shades of brown which are somewhat more violet than those produced by the acridin-acridone alone.

If desired, the mixture of acridin-acridone and diacridone can be resolved into its constituents by extraction with hot meta-cresol, in which the acridin-acridone is fairly soluble.

We wish to be understood as claiming our new acridin-acridone either alone or in admixture with other compounds for instance with the aforesaid diacridone.

The following examples will serve to illustrate further the nature of our invention, which, however, is not limited to these examples. The parts are by weight.

Example 1: Heat together for about 12 hours at 140° C., while stirring, 50 parts of para-amino-para'-chlor-diphenyl, 67 parts of 1-chlor-anthraquinone-2-carboxylic acid and 450 parts of dimethyl-anilin. Remove the dimethyl-anilin by means of boiling dilute hydrochloric acid, wash the residue and extract it by means of boiling sodium carbonate solution, then wash it with water and dry it. Then heat 80 parts of the product with 480 parts of acetic anhydrid, on the waterbath, for about 1 hour, then add to the yellow-brown solution 36 parts of 97% sulfuric acid and heat for 1 hour at 125° C. Filter off the product, wash it with glacial acetic acid, and then with water, and dry it. Then boil together, for 12 hours, 30 parts of this product, 18.3 parts of 1-amino-anthraquinone, 12 parts of calcined soda, 3 parts of cuprous chlorid, and 300 parts of dry nitrobenzene. When cold, filter off the precipitate, wash it with nitrobenzene, distil off the remaining nitrobenzene with steam and extract by means of boiling dilute hydrochloric acid, and dry. Then heat together at 125° C., for about 8 hours, 30 parts of this product and 300 parts of 80% sulfuric acid. Pour the mixture into water, filter off the precipitate, wash it well with water, and dry it. The acridin-acridone thus obtained is a dark brown powder which is very difficultly soluble in the ordinary organic solvents, the solution being red-brown. It is somewhat more soluble in meta-cresol. Its solution in concentrated sulfuric acid is olive and it dyes cotton, from a red-violet hydrosulfite vat, reddish brown shades of excellent fastness.

Example 2: Dissolve 84 parts of 1-chloranthraquinone-2-carboxylic acid and 36 parts of calcined soda in 500 parts of water. Add 36 parts of magnesium oxid and 26.4 parts of benzidin, and heat the whole, in an autoclave, while stirring, at 140° C. for 12 hours. This gives rise to a body which is regarded as dianthraquinonyl - benzidin - dicarboxylic acid. Take up the mass with 4,000 parts of water, heat up, and acidify with hydrochloric acid. Filter off while hot, wash with hot water, and dry. Introduce 75 parts of this product slowly into 750 parts of 96% sulfuric acid, then raise the temperature to from 125° to 130° C. and maintain this temperature for about 5 hours. At this stage a mixture, consisting principally of diacridone and acridin-acridone-carboxylic acid is obtained. To the cooled mass add 450 parts of ice and then heat for 24 hours, while stirring, at about 130° C., whereby the carboxyl group is split off. Pour into 4,000 parts of hot water, filter, wash with water, and extract with dilute boiling caustic soda until the filtrate is almost colorless. Then make it into a paste. The product consists practically of a mixture of acridin-acridone and diacridone. It forms a red-violet vat with hydrosulfite and dyes cotton brown shades of excellent fastness.

Now what we claim is:—

The new dye derived from diphenyl containing an anthraquinone-acridone group on the one side and an anthraquinone-acridin group on the other side of the diphenyl linking, which is free from salt-building groups and which dyes cotton, from a vat, reddish brown shades.

In testimony whereof we have hereunto set our hands in the presence of two subscribing witnesses.

ARTHUR LUTTRINGHAUS.
OTTO LOHSE.
AUGUST SAPPER.

Witnesses:
J. ALEX. LLOYD,
JOSEPH PFEIFFER.